US010251467B2

United States Patent
Donhauser et al.

(10) Patent No.: US 10,251,467 B2
(45) Date of Patent: Apr. 9, 2019

(54) BACKPACK SUPPORT SYSTEM FOR HANDS-FREE TRANSPORT OF A BIKE ON THE WEARER'S BACK

(71) Applicant: AFR Engineering GmbH, München (DE)

(72) Inventors: Dominik Donhauser, München (DE); Teresa Wimmer, Grafing b. München (DE); Roman Setzmüller, Altomünster (DE); Christine Overbeck, München (DE); Felix Weinkauf, München (DE); Ludwig Standl, Boebing (DE); Florian Ruhland, Erding (DE); Andreas Funkenhauser, Assling (DE)

(73) Assignee: AFR ENGINEERING GMBH, Munich (DE)

( * ) Notice: Subject to any disclaimer, the term of this patent is extended or adjusted under 35 U.S.C. 154(b) by 0 days.

(21) Appl. No.: 15/887,127

(22) Filed: Feb. 2, 2018

(65) Prior Publication Data

US 2018/0220780 A1 Aug. 9, 2018

(30) Foreign Application Priority Data

Feb. 3, 2017 (DE) .................... 20 2017 100 591 U

(51) Int. Cl.
*A45F 3/10* (2006.01)
*B62H 3/00* (2006.01)
(Continued)

(52) U.S. Cl.
CPC ................. *A45F 3/08* (2013.01); *A45F 3/12* (2013.01); *B62J 99/00* (2013.01); *A45F 3/10* (2013.01);
(Continued)

(58) Field of Classification Search
CPC ...... A45F 3/08; A45F 3/10; B62H 3/00; B62J 2099/0053
(Continued)

(56) References Cited

U.S. PATENT DOCUMENTS

| 4,448,437 A | * | 5/1984 | Montague | B62K 15/006 280/278 |
| 5,016,794 A | * | 5/1991 | Beagle, Jr. | A45F 3/14 211/60.1 |

(Continued)

FOREIGN PATENT DOCUMENTS

DE 202011101072 U1 9/2011

*Primary Examiner* — Justin M Larson
(74) *Attorney, Agent, or Firm* — Polson Intellectual Property Law, PC; Margaret Polson

(57) ABSTRACT

A backpack support system has a frame, which is equipped with shoulder straps and preferably also a waist belt and which preferably inherently rigid so hat the loads that occur during use, the frame only flexes by inevitable amounts in the millimeter range by which any rigid body flexes when subjected to a load. A bike mount is fastened to the frame. The bike mount is embodied so that the bike, almost exclusively by its frame or frame components such as the rear fork can be fastened directly to the frame, i.e. without luggage or a pack compartment being situated between the bike and the frame in the points at which the bike rests directly against the frame. When properly fastened, the bike is thus affixed to the frame so that it cannot move.

15 Claims, 12 Drawing Sheets

(51) Int. Cl.
  *A45F 3/08* (2006.01)
  *B62J 99/00* (2009.01)
  *A45F 3/12* (2006.01)
  *A45F 3/00* (2006.01)
  *A45F 3/04* (2006.01)
(52) U.S. Cl.
  CPC ... *A45F 2003/003* (2013.01); *A45F 2003/045* (2013.01); *A45F 2003/122* (2013.01); *B62H 3/00* (2013.01)
(58) Field of Classification Search
  USPC .................................. 224/627, 269, 261, 633
  See application file for complete search history.

(56) References Cited

U.S. PATENT DOCUMENTS

| | | | | | |
|---|---|---|---|---|---|
| 5,082,123 | A * | 1/1992 | Lamb | ...................... | A47B 81/00 211/18 |
| 5,975,389 | A * | 11/1999 | Braun | ................... | A01M 31/02 182/187 |
| 6,142,491 | A * | 11/2000 | Darling, III | .......... | B62B 5/0023 224/627 |
| 6,155,470 | A * | 12/2000 | Robison | ................ | F41B 5/1461 224/259 |
| 7,669,822 | B2 * | 3/2010 | Kluge | ..................... | F16B 45/02 211/18 |
| 8,047,492 | B2 * | 11/2011 | Wang | ....................... | B62H 3/12 211/106.01 |
| 8,496,143 | B1 * | 7/2013 | Joseph | ...................... | A45F 3/14 224/201 |
| 8,820,543 | B2 * | 9/2014 | Huang | ..................... | B62H 3/12 211/107 |
| 2005/0109804 | A1 * | 5/2005 | Larsen | ...................... | A45F 3/10 224/153 |
| 2006/0180554 | A1 * | 8/2006 | Lang | ........................ | B62H 3/02 211/18 |
| 2010/0230450 | A1 * | 9/2010 | Tomberli | .................. | A45F 3/10 224/261 |
| 2014/0209646 | A1 * | 7/2014 | Hoppa | ..................... | A45F 3/08 224/261 |

* cited by examiner

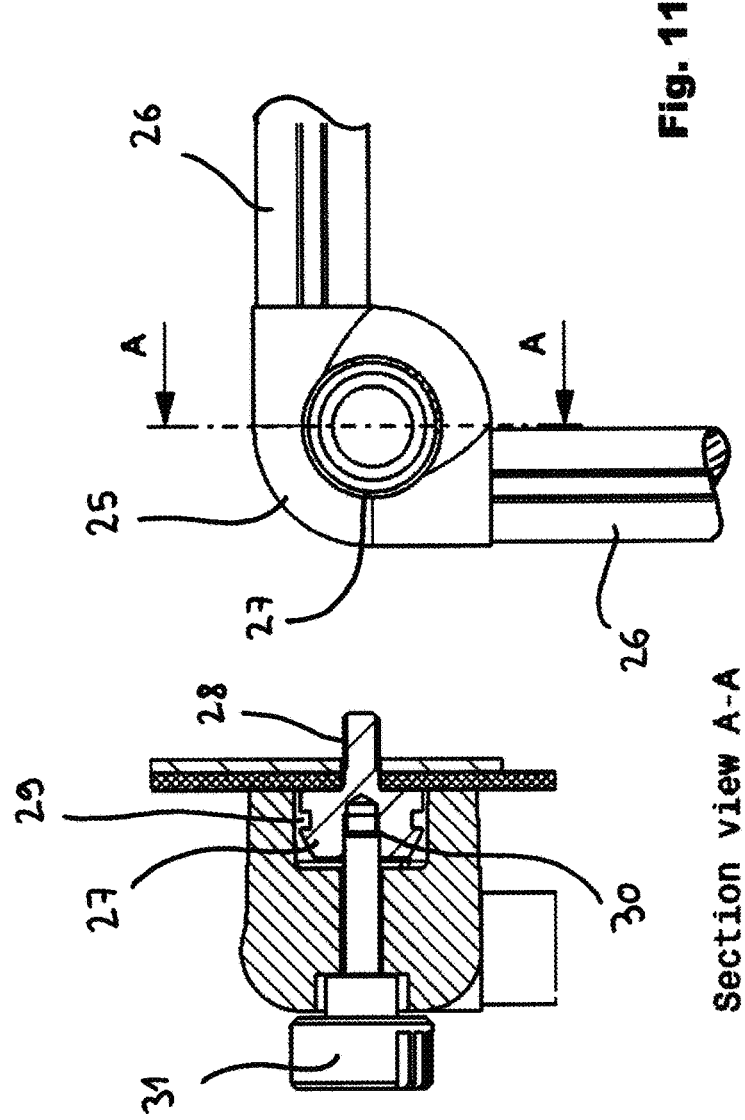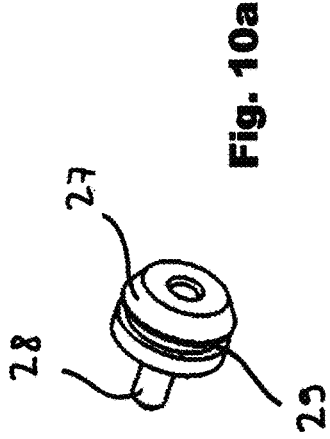

BACKPACK SUPPORT SYSTEM FOR HANDS-FREE TRANSPORT OF A BIKE ON THE WEARER'S BACK

CROSS REFERENCE APPLICATIONS

This application is a non-provisional application claiming priority from German Application no. 20 2017 100 591.7 filed Feb. 3, 2017, which is hereby incorporated by reference for all purposes.

BACKGROUND

A person who takes demanding mountain bike tours high in the mountains is continually confronted with having to negotiate stretches in which the ground is so poor and/or steep that even with great skill, it is not possible to either ride or push the bike over this stretch. It then becomes necessary to carry the bike, which is tiring.

Various techniques are recommended for this.

For short pushing stretches, the bike is grasped by the frame or the rear fork beneath the seat tube, lifted, and carried on one's side.

Alternatively, the bike is carried to one's side over the shoulder by grasping the frame triangle with one arm and then placing the bike on one shoulder, which quickly becomes uncomfortable because of the very uneven load distribution.

Longer or steeper pushing stretches can often only be negotiated if the bike is carried over one's head. To do this, the head is inserted through the frame triangle and the bike is placed on both shoulders. Transporting in this way is somewhat more comfortable, but is not safe because if one slips on loose ground, it is not possible to spontaneously throw off the bike.

In order to make carrying more comfortable, it has also already been suggested to pack the backpack in such a way that when carrying in this way, the bike frame rests partly on the top of the backpack instead of on the shoulders.

It has also already been proposed to provide corresponding padding in the form of inflatable air cushions, which are integrated into a backpack in order to facilitate the carrying, see DE 20 2011 072 U1.

Nevertheless, even with this kind of carrying, there is no thought of having both hands free in order, for example, to be able to climb or support oneself somewhere.

There are also already known bike-transporting backpacks whose cargo compartment accommodates the disassembled or collapsed bike and which is then worn on the back. Such backpacks are not suitable for use in high mountains because of their size, but they do represent a convenient option for bringing the bike, for example, to the airport for baggage check-in.

An aspect of the disclosure is to create a transport system that can be used to transport an entire bike on the body without having to disassemble or collapse the bike, leaving the hands of the wearer free during the carrying and even making it possible to pass through narrow passages.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The backpack support system according to the disclosure makes it possible to transport a bike on the back in a hands-free way.

To this end, the backpack support system has a frame, which is equipped with shoulder straps and preferably also a waist belt and which is as a rule inherently rigid. This means that with the loads that occur during use, the frame only flexes by inevitable amounts in the millimeter range by which any rigid body flexes when subjected to a load.

A bike mount is fastened to the frame. The bike mount is embodied so that the bike, almost exclusively by its frame or frame components such as the rear fork can be fastened directly to the frame, i.e. without luggage or a pack compartment being situated between the bike and the frame in the points at which the bike rests directly against the frame. When properly fastened, the bike is thus affixed to the frame so that it cannot move. It does not swing back and forth unlike a bike that is strapped to the lashing eyes mounted on the outside of the pack compartment of a backpack. In some cases, this means that the bike rests in the holders in a directionally secure fashion. It can, in the event of an elevated torque, rotate away—e.g. counterclockwise to the left. But the advantageous placement of its center of gravity causes it to always fall back into the upper holder.

The bike mount in this case is composed at least or preferably only of a first and second anchoring point, which are spatially separated from each other, preferably by at least 150 mm. As a rule, the frame and the anchoring points are embodied and positioned so that the bike can be fastened to the frame in such a way that it is carried upended and transversely to its actual riding direction, i.e. with the front tire toward the top and at least with the rear tire (entirely or essentially) perpendicular to the walking direction of the person carrying the bike. It is therefore possible to pass through even narrow passages with the bike on the back.

The backpack support system according to the disclosure advantageously has a so-called external frame. Whereas with normal backpacks that have a frame, this frame is situated to the front of the side of the pack compartment facing the wearer's back, or is incorporated into the side of the pack compartment facing the wearer's back and then is adjoined toward the outside by the pack compartment, in the backpack support system according to the disclosure, exactly the opposite is preferably the case. A pack compartment is positioned directly adjacent to the wearer's back or rests against the wearer's back. The frame or a part of the frame such as a back plate is provided only on the side of this pack compartment facing away from the wearer's back, toward the outside. The bike is mounted on this outer part of the frame or on its back plate.

A main pack compartment can be provided, which, whenever a bike is not loaded, is mounted onto the side of the external frame facing the wearer's back so that in this state, the external frame is sandwiched between the pack compartment resting directly against the back and the main pack compartment.

It has turned out to be particularly advantageous to embody the anchoring points for affixing the bike directly to the frame as at least inherently rigid hooks in which the bike can be simply hung, preferably without having to tie or cinch any straps, cords, or fasteners. At the same time, each hook can also be rigidly fastened to the frame. Ideally, though, the fastening of the hook is designed so that when not in use, the hook can be pivoted away or folded in, for example so that it lies parallel to the plane defined by the frame, in any case in the immediate vicinity of the hook. Ideally, one of the hooks is open at the top so that the bike can be hung in this hook from above.

It is particularly advantageous if the other hook opens laterally in the direction toward the hook that is open at the top so that after the bike is inserted into the upward-opening hook, it can be pivoted laterally into this other hook.

A method for carrying a bike is also disclose which features the fact that the bike is carried upended with the front wheel toward the top and with the rear wheel perpendicular to the walking direction of the person carrying the bike on his back. A method in which the bike is fastened to the frame of a backpack in such a way that when the backpack support system is viewed in the usage position, the bike is first hung from above in a lower hook on the frame of the backpack and then pivoted laterally into the other hook on the frame of the backpack, with the lower hook being positioned relative to the center of gravity of the bike so that the bike always tends to rotate around the lower hook so that it pivots into the upper hook. How and with what frame parts the bike is hung in the hooks will be described in greater detail further below. The method makes use of the device according to the disclosure and of the various embodiment options of the device according to the disclosure.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 10 shows a receiving pin 27, which is used in the third exemplary embodiment, but can also be used for the other exemplary embodiments.

FIG. 10A shows a receiving pin 27 in a single view.

FIG. 11 shows an enlarged view of a corner of the subframe of FIG. 9.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

First of all, the expressions "head end," "foot end," "vertical," "horizontal," "vertical axis of the wearer," and the like used here refer to the state in which the backpack is being worn properly on the wearer's back.

Figure 1:
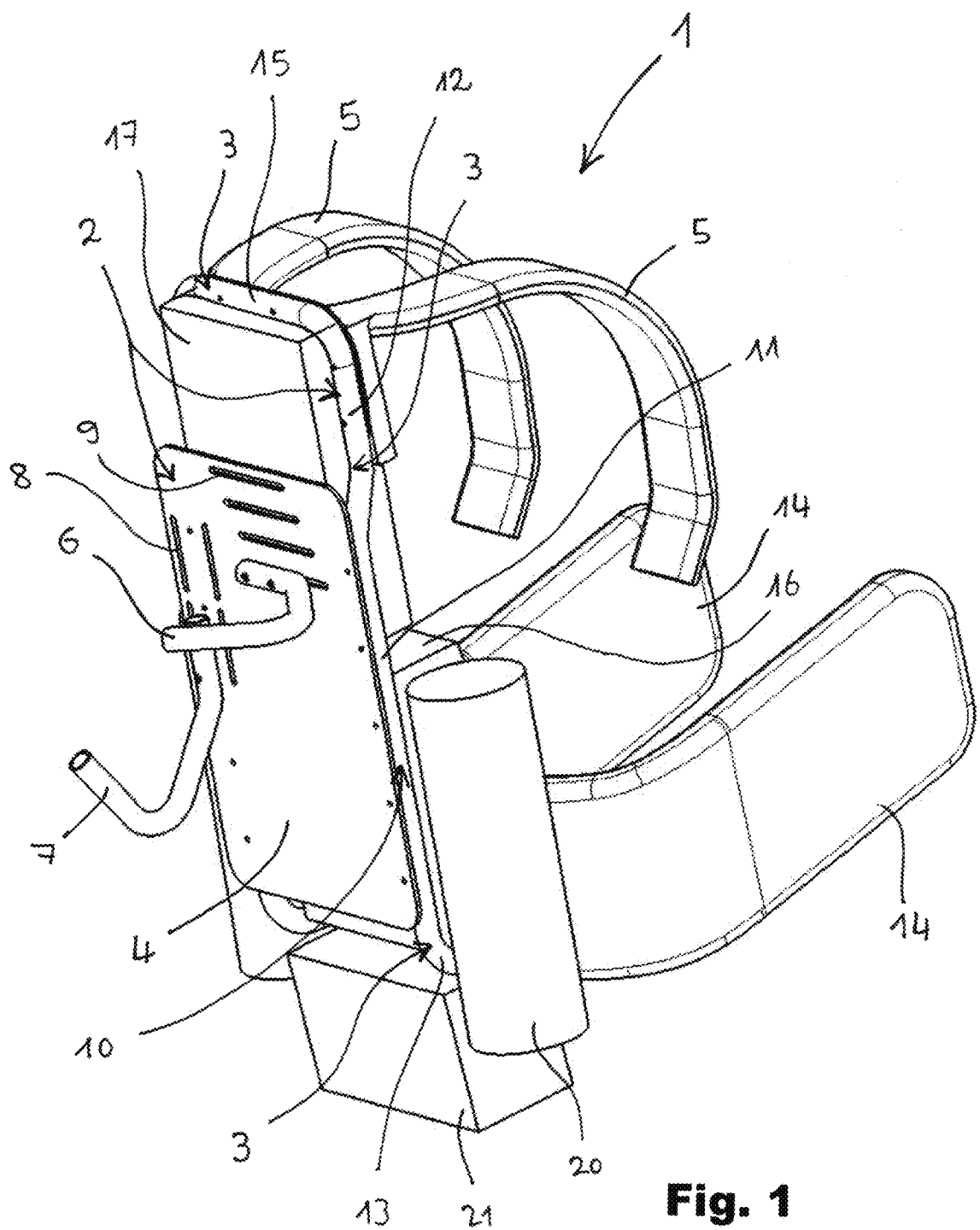
FIG. 1 is an oblique rear view of a first exemplary embodiment of the backpack support system according to the disclosure before the bike is loaded.

The best overview of the backpack support system according to the disclosure for transporting a bike on the wearer's back in a hands-free way is provided by FIG. 1. In this case, "hands-free" means that the bike can be carried on the back without the wearer having to use a hand in order to hold the bike in its position on his back. Instead, the bike is fastened to the backpack support system so that when it is being carried, it automatically remains in its proper position on the back. This is true even if the carrying system is preferably designed so that the bike is merely hung and can be unhung by simply grasping it, without having to release a fastener or strap.

The drawing clearly shows the frame 2, which in this specific instance is composed of a rod or tube frame 3 and the back plate 4. It should be stated at this point that the back plate 4 is particularly advantageous for reasons that will be explained in greater detail below. In the individual instance, however, it could also be replaced by additional sections on the rod or tube frame 3 itself—for example by horizontally and/or vertically extending struts, not shown here in the figure, between the side parts of the rod or tube frame 3, which permit an appropriate positioning and possibly adjustment of the hooks.

Shoulder straps 5 are attached to the rod or tube frame 3. Ideally, the shoulder straps 5 are fastened to the rod or tube frame 3 in a vertically adjustable way in order to be able to adjust the backpack to different body sizes. This can happen because the rod or tube frame 3 is embodied like a flute, with a number of fastening holes at different heights. By means of the shoulder straps 5, the rod or tube frame 3 can be worn on the back like a backpack.

As a rule, a hip belt 14 is provided. The hip belt is positioned so that it transfers the majority and ideally, at least ⅔ of the load to the hip region of the wearer.

The described backpack support system in the frame of this exemplary embodiment features a particularly clever way of fastening the bike so that it is ready to carry.

The bike is hung on the backpack support system here by means of at least—and ideally only—one first hook 6 and one second hook 7. The hooks are preferably designed and positioned so that the bike to be carried can be made ready for carrying by simply hanging it in the hooks. It is not necessary to additionally fasten the bike by means of cords or additional straps or hook-and-loop fasteners that participate in absorbing the weight force of the bike acting in the vertical direction.

The hook 7 is intrinsically rigid and preferably is rigidly fastened as a whole to the frame 2. Basically, the same is true of the hook 6 unless this is a "snap-in hook." In such a snap-in hook, at least one leg is mounted in a sprung, movable fashion to the rigidly affixed hook base in order to be able to snap the hook 7 in a form-fitting way onto the down tube of the bike frame—like a similar to a clamp fastener for snapping onto the handle of a broom that is to be secured to the wall of the broom closet. Such a snap fastener is particularly advantageous because when extreme movements occur, it also prevents the bike from unintentionally coming out of the hook.

Optionally, one hook or both hooks 6, 7 can also be provided with an additional closure, e.g. like a ski boot clasp or an elastomer or rubber closure (e.g. like the kind used as an additional closure for the hoods of rally vehicles) so that the frame part of the bike that is hung in the hook is additionally secured in a form-fitting way against slipping out.

Regardless of the two latter options, the snap-in hook as such retains its position and orientation even under load, at least essentially. All that occurs is the elastic deformations in the millimeter or submillimeter range that are inevitable, even in rigid bodies, under load. The hooks are ideally composed of aluminum or carbon. Independently of this, they can if necessary be hollow in order to reduce weight.

Both of these hooks have a particular placement. As is evident, the two hooks 6 and 7 are mounted at different heights, viewed along the vertical axis of the wearer. At the same time, the two hooks 6 and 7 are not mounted one above the other, instead being positioned spaced apart from each other in the horizontal direction.

In this case, the hook 6 is the upper hook, while the hook 7 is the lower hook.

The upper hook 6 is preferably mounted in the middle or essentially on the vertical center line M between the two shoulder straps 5, in the latter case with a position tolerance of +/−35 mm. Ideally, its position is adjustable in the horizontal direction, i.e. the hook can be fastened in different positions in order to be able to adjust the position of the center of gravity of the bike to be carried. By contrast, the lower hook 7 is preferably mounted in an off-center position. It is then spaced apart from the vertical center line between the two shoulder straps 5 by a distance of at least 90 mm.

The upper hook 6 is preferably mounted at a height that lies in the vicinity of the shoulder blades of the wearer, advantageously with a tolerance of +/−50 mm. The lower hook 7 is mounted approximately at the height of the center of the back, advantageously with the same tolerance as mentioned above for the upper hook. The lower hook is preferably positioned so that—for example in the case of a man who is 160 cm tall and a size S mountain bike with 29-inch wheels—there is still a distance of at least 20-30 cm between the ground and the rear wheel so that the wearer is not impeded by the bike coming into contact with the ground when he is walking downhill.

Ideally, the two legs that form the lower hook 7 are oriented so that they extend in a plane (or plane group) that is completely or at least essentially vertical. The hook 7 is open toward the top so that the bike is hung in it from above. The two legs that form the upper hook 6 define a plane that is oriented transversely and preferably at an angle of approximately 90° to the plane in which the two legs of the hook 6 lie. The hook 6 is open at the side oriented toward the hook 7.

Figure 4:
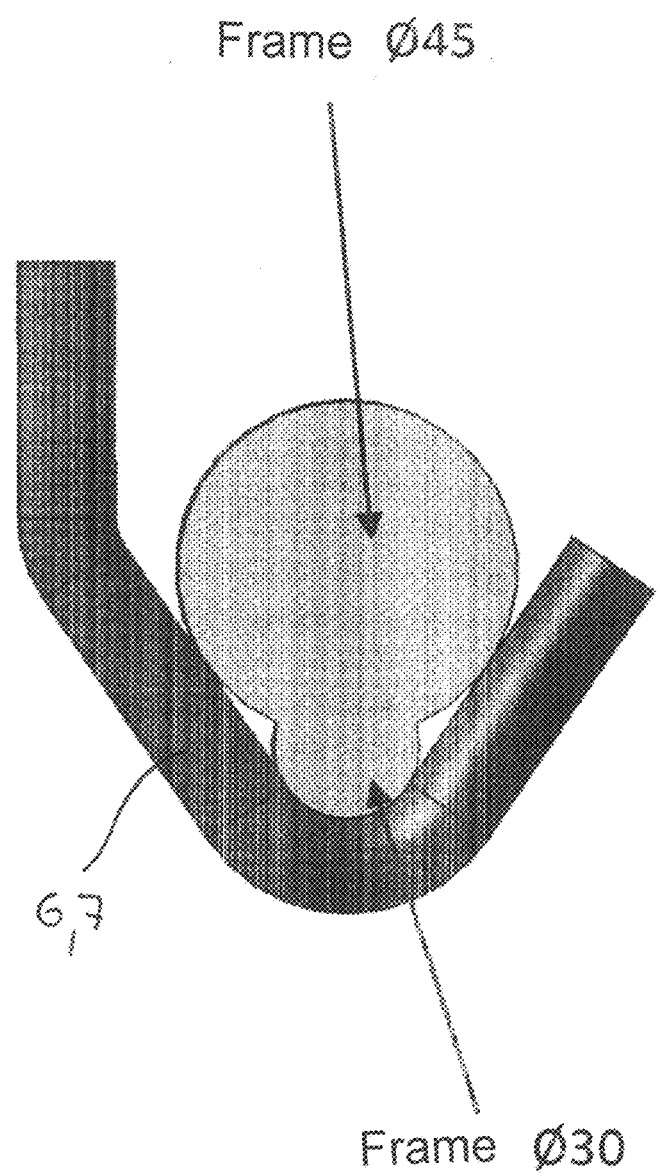
FIG. 4 shows the precise design of one of the hooks as a supplement to FIG. 1.

The legs of at least one hook or better still, both hooks, can be embodied as V-shaped or U-shaped or if need be, can also be embodied as correspondingly rectangular in the form of a double-L profile. Ideally, they are embodied as V-shaped, as illustrated by FIG. 4. Then they are able to clamp a frame part of the bike between themselves in a rattle-free way. The V-shaped legs are inclined relatively to each other, ideally so that frame tubes with an outer diameter of between 28 mm and 55 mm can be clamped in a rattle-free way between the two legs of a hook. It is particularly advantageous if the legs have a coating that increases the friction in comparison to a bare or painted metal surface, for example made of rubber, unvulcanized rubber, particularly preferably neoprene, or an elastomer, in particular a thermoplastic elastomer. This coating can be applied like a paint or can, for example, be embodied as a permanently attached or shrink-fit sleeve composed of an appropriate material.

Figure 3:
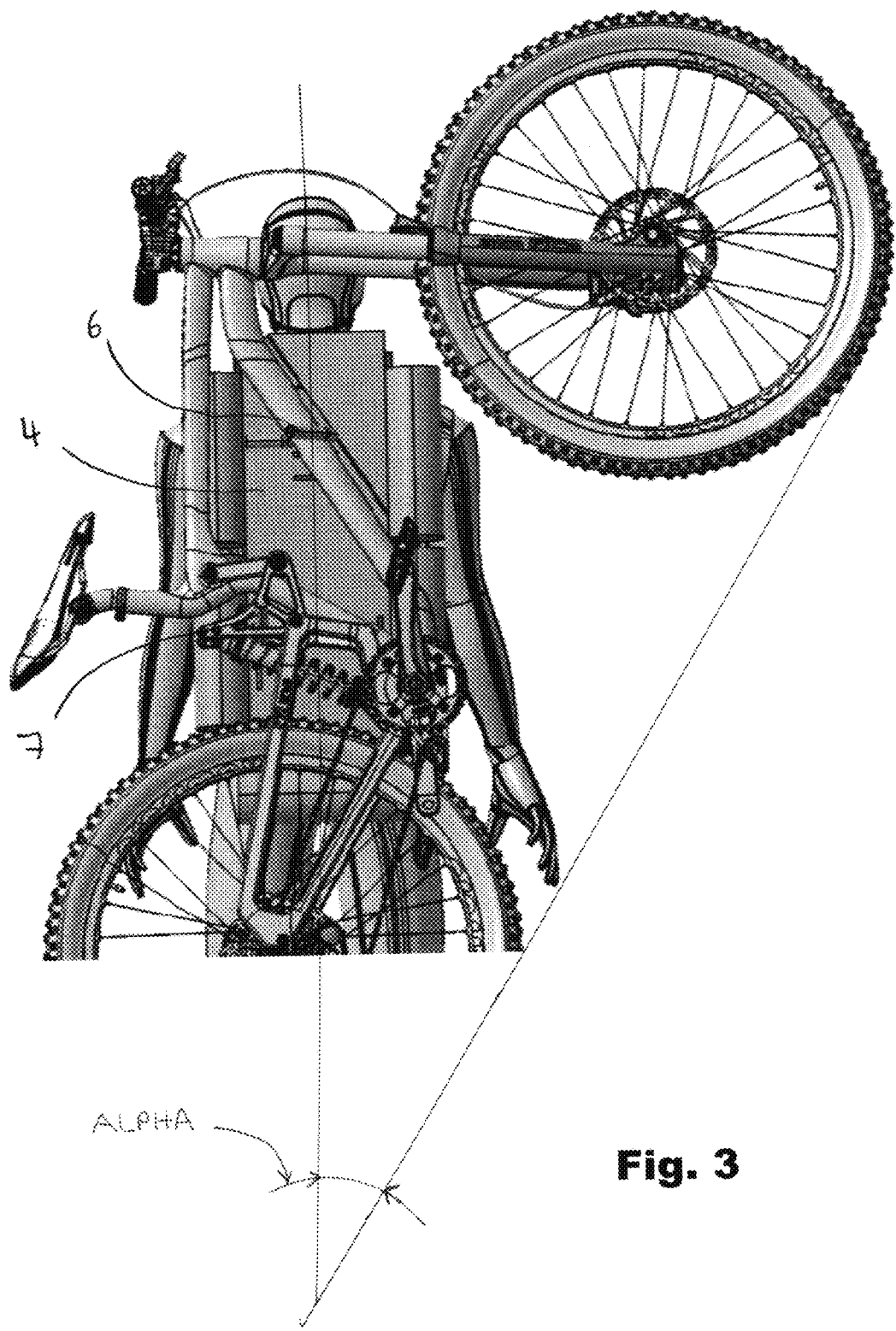
FIG. 3 shows how the bike is carried with the system according to FIG. 1 after being loaded onto the backpack.

FIG. 3 gives the best view of how a bike that is to be transported is hung on the backpack support system in order to then, after the backpack support system has been slung onto the shoulders, be carried in a hands-free way. As is clear from the drawing, the bike is preferably carried in an upended fashion or in any case so that its so-called straight-ahead travel direction, which is predetermined by its wheels, assumes an acute angle ALPHA of no more than 37.5° and better still, of no more than 30° relative to the vertical. The latter is important above all because the backpack support system according to the disclosure is primarily used for carrying mountain bikes in the alpine region. Specifically in such an application, the bike cannot be carried transversely for reasons of safety and space. The two hooks 6 and 7 are arranged in corresponding fashion.

The lower hook 7 is used or utilized in such a way that with a conventional diamond frame, the frame tube holding the seat post is hung in it. In full-suspension bikes, usually the rear fork is hung in the lower hook 7, in any case provided that it has a section that extends parallel to the direction of the seat post. The hook 7 is positioned and suspended so that the plumb line of the bike's center of gravity does not extend through the hook 7, but instead through the region that lies between the hook 6 and the hook 7, viewed in the horizontal direction.

Because the lower hook 7 is positioned in the above-described way, it is able to absorb more than ⅔ and ideally, even essentially all of the weight force of the bike acting in the vertical direction. Thanks to the off-center placement of the hook 7, the bike tends to rotate around the hook 7 so that it pivots into the hook 6. In this way, the down tube of the bike is automatically inserted into the hook 6. This also happens specifically because the hook 6 is oriented obliquely or at right angles to the hook 6, see FIG. 1. Its open hook side therefore receives the down tube that extends obliquely upward. The decisive factor is that the down tube of the bike always tends to slide into the hook 7, even if the wearer sways.

This produces an extremely quick and thus secure fastening. The bike is hung in the lower hook 7 and then rotated into the upper hook 6. The removal takes place in the reverse order. In other words, both the hanging and the removal are carried out by means of a combined translatory and rotary movement. This is the most important for use in the mountains since on challenging mountain bike trails, riding sections and carrying sections often alternate so quickly that it is of essential importance to be able to load and unload the bike by simply hooking and unhooking it.

Figure 7:
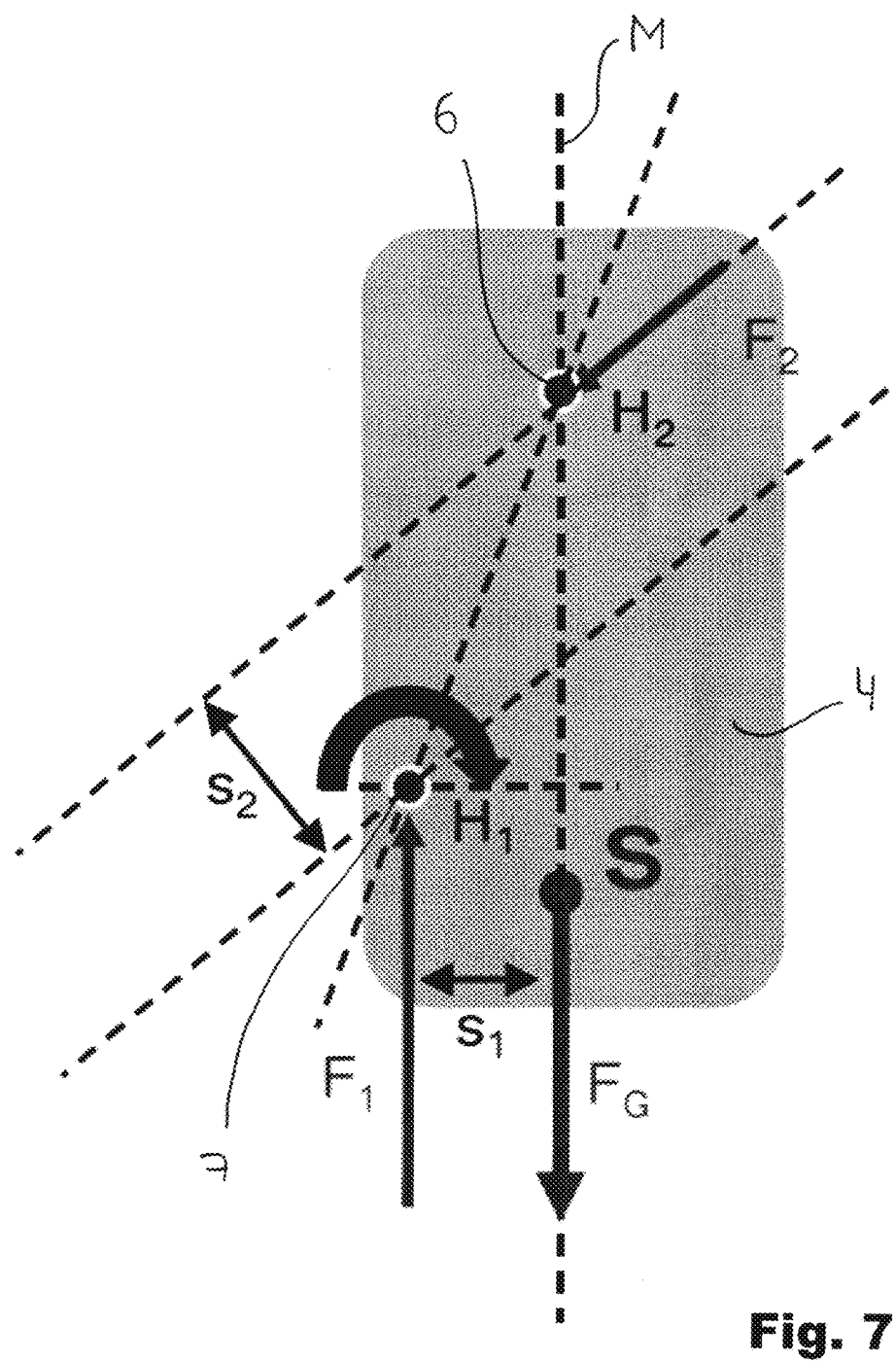
FIG. 7 shows the forces and moment ratios that occur during use of the hooks according to the disclosure.

The reason why the fastening is self-retaining, so to speak, is shown most clearly in FIG. 7, which schematically depicts the ratios, possibly in connection with FIG. 3. FIG. 7 clearly shows the back plate, which will be discussed in greater detail below. The upper hook 6 and lower hook 7 and the imaginary center line M between the two shoulder straps 5 are clearly visible. The upper hook 6 in this case is positioned exactly on the center line M. The lower hook 7 in this case is positioned off-center on the left side. The bike is preferably hung in the lower hook 7 so that in the transport position of the bike, a center of gravity comes to lie on the center line M. The bike consequently tends to execute movements in the clockwise direction and its down tube, as explained above, automatically rotates into the upper hook 7. If one disregards the friction forces in a first-order approximation, then the lower hook 7 absorbs the vertical weight force FG of the bike, while a force acting predominantly in the horizontal direction is exerted on the upper hook in the direction perpendicular to the surface of the down tube on which the weight acts. It is noteworthy that a force component acting in the vertical direction can be present at the upper hook 6, which inhibits an unwanted disengagement of the bike from the hook 7. Such an unwanted disengagement can potentially occur when the rear wheel of the bike briefly comes into contact with the ground when the wearer is descending a sharp slope. This unhooking safety can be significantly improved further if the upper hook is provided with a friction-increasing coating and/or the hook is provided with the V shape discussed in detail above.

The following torque equilibrium occurs:

$$\Sigma MH1: Fg*S1 - F2*S2 = 0$$

At the same time, the following force equilibrium prevails:

$$Fg*S1 = F2*S2$$

As a result, the bike rests securely in the holders.

The back plate 4, which has already been mentioned several times, is positioned between the bike and the padding that rests directly against the wearer's back. It forms a shield for protecting the wearer's spinal column. In the event of a backward fall such as a slip that occurs during a steep descent over loose ground, the back plate 4 prevents hard frame parts or the hooks 6 and 7 from poking into the back and distributes the load acting on the back over its entire area. For this purpose, the back plate is preferably embodied as wide enough to cover the wearer's spinal column over most of its length or over its entire length. The width of the back plate advantageously corresponds approximately to the shoulder width or to the distance between the two shoulder straps 5. The back plate 4 is composed either of sheet metal, preferably sheet aluminum, of plastic, of a wooden plate, typically a plywood plate made with waterproof glue or of carbon. As a rule, it has dimensions of at least 200 mm in the horizontal direction and at least 350 mm in the vertical direction, preferably with a thickness of between 0.3 mm and 5 mm.

Preferably, the back plate 4 simultaneously functions as a base for rigidly mounting the hooks 6 and 7, ideally by means of a detent connection or screw connection that is produced without tools. The back plate and/or the hooks is/are embodied so that the hooks 6 and 7 can be mounted in different alternative positions on the back plate. In this way, the backpack support system according to the disclosure can be adjusted to the physique of the wearer and to the size and weight distribution of the bike to be transported.

As is clearly shown, the back plate is equipped with different mounting openings 8 for the first hook 6. These mounting openings 8 are preferably embodied as respective oblong holes, which preferably extend in the horizontal direction. It is thus possible to mount the first hook 6 at different heights. At the same time, it is also possible to adjust its orientation relative to the center line M between the shoulder straps 5.

The back plate 4 is simultaneously equipped with different mounting openings 9 for the second hook 7. These are also preferably embodied as respective oblong holes, which ideally extend in the vertical direction. It is thus possible to mount the second hook 7 at different distances from the center line M between the shoulder straps 5 and to adjust its height.

At this point, reference is once again made to FIGS. 1 and 2.

A rod or tube frame 3 is fastened to the back plate 4, preferably on its side directly facing the wearer's back. As is clearly shown, the rod or tube frame 3 has two rod or tube sections 10. Each of these rod/tube sections 10 has a middle section 11. The middle section 11 rests against the back plate 4 and is fastened to it, preferably screwed, riveted, or welded to it.

Toward the head end, this middle section 11 is adjoined by a first edge section 12. At least in parts, the latter is curved so that it forms a fastening region for a shoulder strap 5, which lies closer to the wearer's body than the above-mentioned middle section 11. Ideally, toward the hip end, the middle section 11 is adjoined by a second edge section 13. At least in parts, the latter is curved so that it forms a fastening region for a hip belt 14, which lies closer to the wearer's body than the above-mentioned middle section 11. For this purpose, it is particularly advantageous if the second edge section 13 constitutes a hook as shown in FIG. 4, for example in the form of a hook that opens toward the top.

As is clearly shown in FIG. 1, the two first edge sections 12 of the two rod or tube sections 10 are connected to each other by means of a connecting section 15.

Ideally, the rod or tube frame 3 is embodied as a one-piece bent metal part in its above-described sections. Apart from the connecting section 15, it is not necessary to provide another connection of the two rod or tube sections 10 in the horizontal direction since the stabilization in the horizontal direction is provided by the back plate 4.

Because the fastening points for the shoulder straps 5 and the hip belt 14 relative to the back plate 4 are shifted in the direction toward the wearer's body, the back plate and the bike that is fastened to it are spaced apart from the wearer's body. This is particularly advantageous since the rear wheel of the bike, which is carried in an upended fashion, extends into the vicinity of the wearer's fibula. It is therefore necessary to provide enough space between the wearer's fibula and the bike so that the wearer can walk largely uninhibited and can also comfortably travel longer distances.

Figure 2:
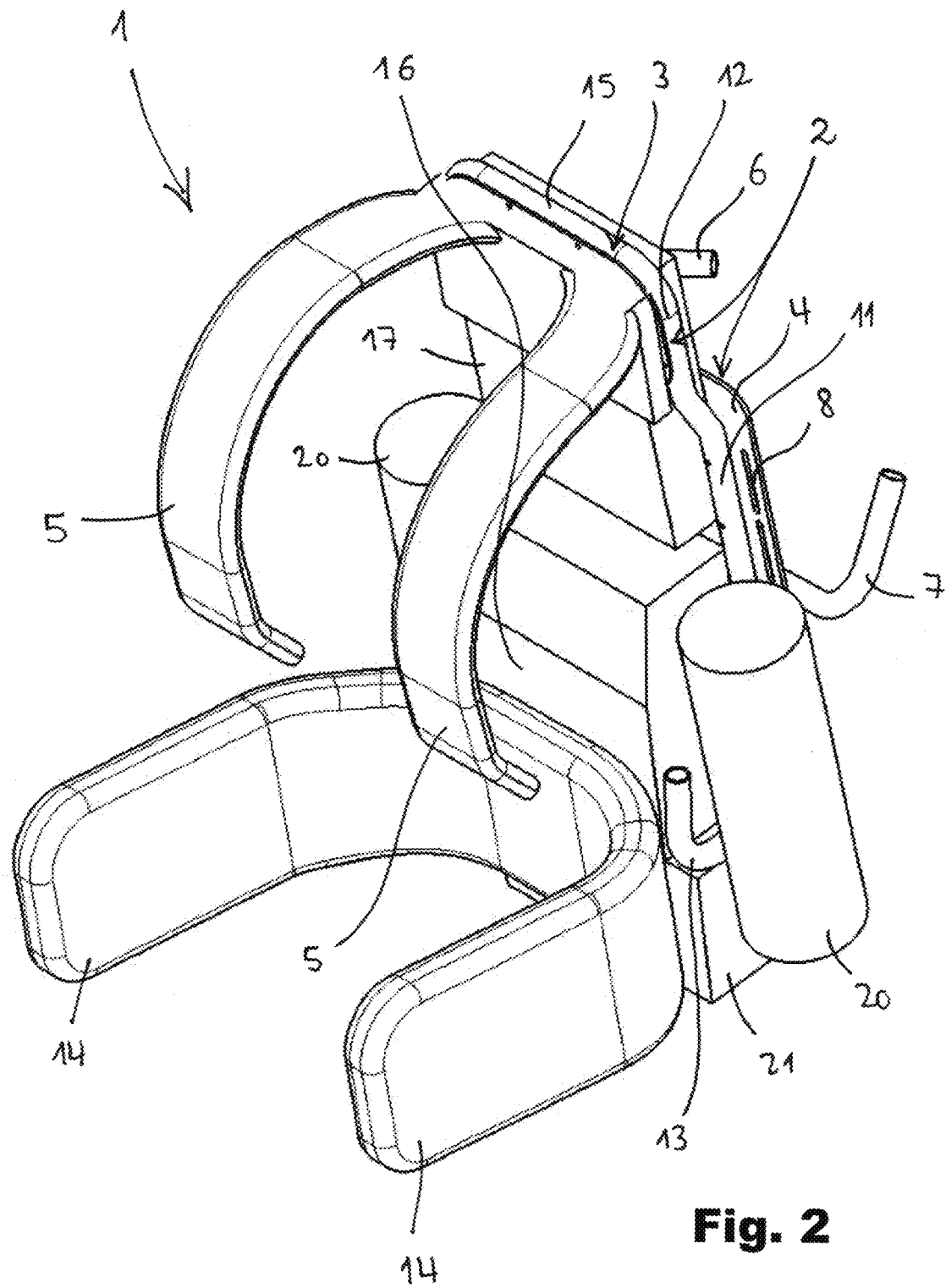
FIG. 2 is an oblique front view of the backpack support system according to the disclosure according to FIG. 1 before the bike is loaded.

For this reason, a spacer 16 is provided at least between the hip belt and the back plate, which is most clearly shown in FIG. 2. As a rule, its thickness is chosen so that the back plate is held so that it is spaced at least 7.5 cm, or better still, at least 10 cm, and ideally, at least 14 cm from the wearer's back.

This spacer 16 can be a simple pad such as a foam part. It is significantly better, however, to use the space between the hip belt and the back plate and to embody the spacer 16 as a preferably dimensionally stable hollow receptacle 17 for accommodating gear. In order to be able to neatly load the hollow receptacle, it preferably has at least one side opening for loading and unloading. In this case, "dimensionally stable" means that the hollow receptacle is permitted to have a certain elasticity of the kind that is inherent, for example, in a plastic box. At the forces that occur during carrying operation, it can be compressed by no more than 10 mm in the horizontal direction and in particular, cannot be crushed. In this case, a dimensionally stable hollow receptacle has the advantage that on its surface facing the wearer's back, it can be provided with a padding, which, regardless of the contents of the hollow receptacle, rests in a defined way against the wearer's back or provides additional padding to the hip belt on its side facing away from the wearer. Naturally, the spacer 16 can instead be embodied in the form of a crushable pocket, particularly if the hip belt 14 is tightly clamped between the second edge sections 13 and the pocket situated between it and the back plate 4 does not press against the wearer's back during wearing.

Above the spacer 16, i.e. in the upward-elongated region between the hip belt and the back plate 4, at least one other pocket or at least one dimensionally stable hollow receptacle 17 can be provided on the side of the back plate 4 directly facing the wearer. It is attached to the rod or tube frame 3 and/or directly to the back plate. It can be useful for the pocket or the at least one dimensionally stable hollow receptacle to be provided with padding on its surface facing the wearer's back, as has already been described above for the spacer.

Even if it is not explicitly depicted in the figures, it must nevertheless be stated that the back plate or the tube frame can have additional anchoring points for pockets to be optionally attached to it. The additional anchoring points are preferably embodied as openings through which, for example, the belt of a hook-and-loop fastener or a belt to be closed by means of a strap can be guided.

Ideally, the backpack support system includes at least one, preferably two side pockets 20, which are ideally designed for upright accommodation of a water bottle. The side pockets 20 preferably each have a cylindrical design for positionally accurate accommodation of a water bottle in a standing position. This at least one side pocket 20 can be respectively fastened in the region of a vertically extending side edge of the back plate 4, preferably attached directly to them and/or to the respective rod or tube section 10 of the rod or tube frame 3.

Preferably, the backpack support system has at least one back pocket 21. This is located under the spacer 16, between the hip belt 14 and the back plate 4. It is preferably attached directly to the second edge section 13 of the above-mentioned rod or tube sections 10. This is particularly true if they are embodied as a hook with a preferably horizontally extending section on which the back pocket can be suspended, preferably in such a way that it does not oscillate.

Figure 5:
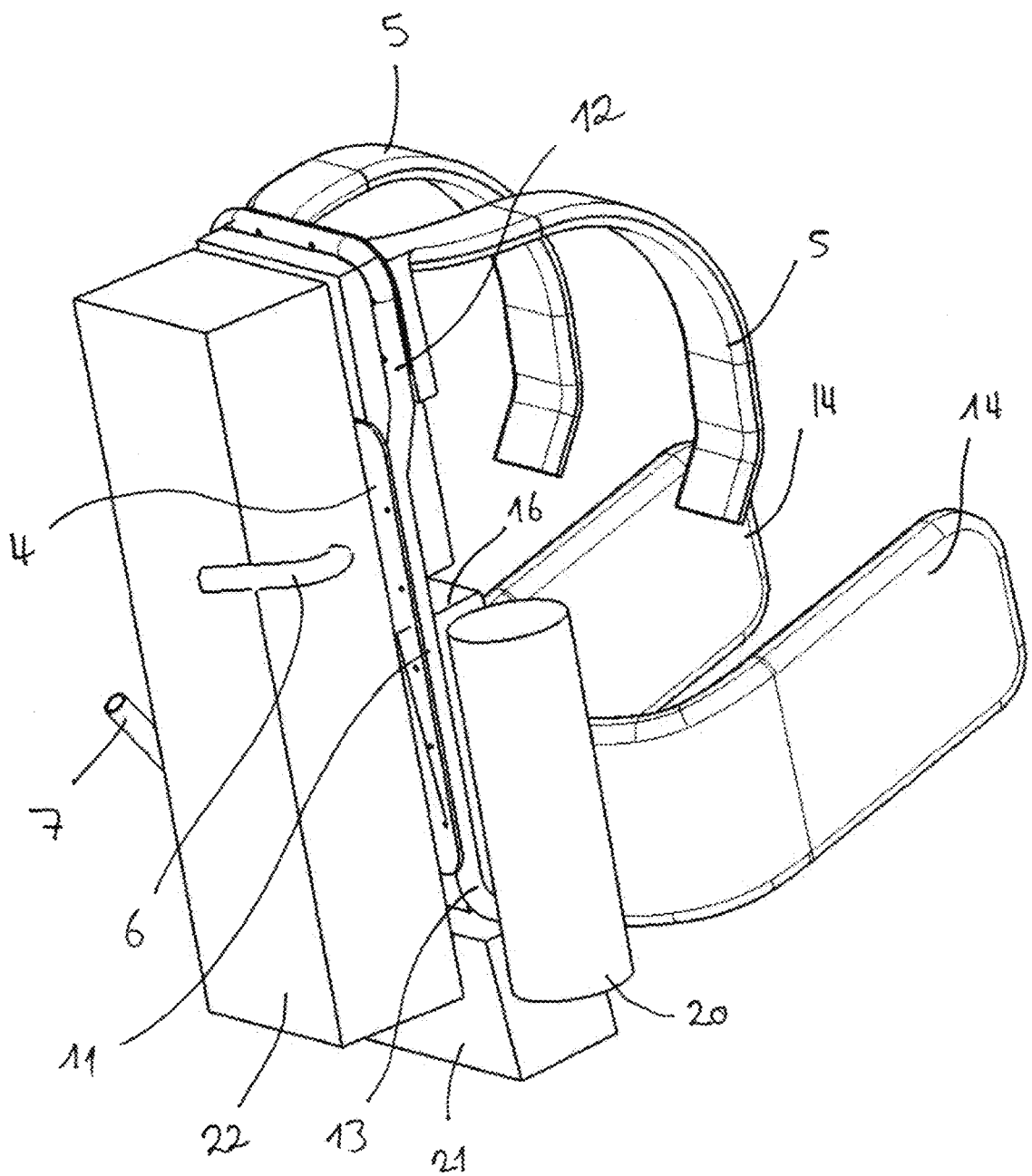
FIG. 5 shows the backpack support system according to the disclosure according to FIG. 1 from behind with a main pack compartment mounted on it.
Figure 6:
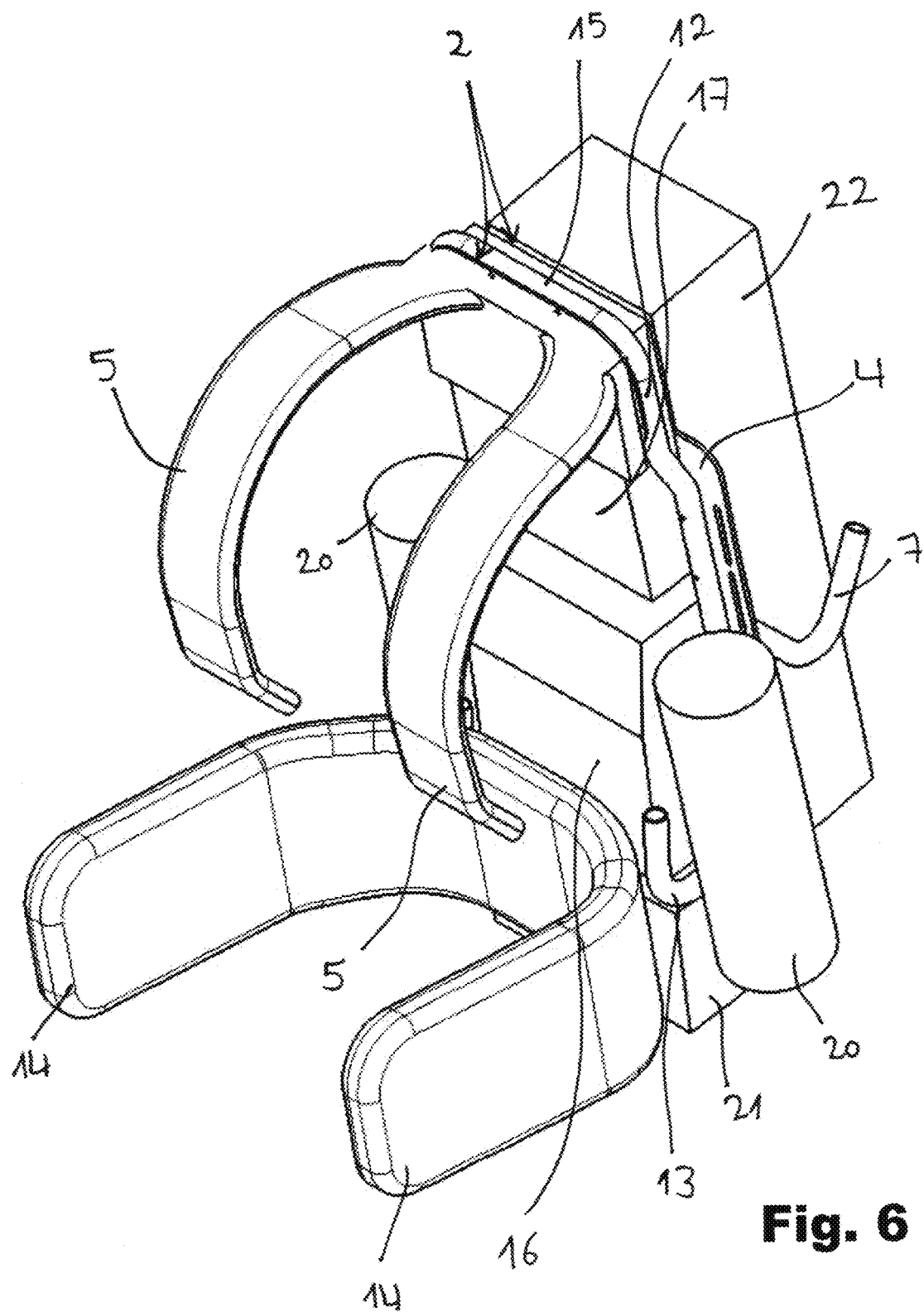
FIG. 6 is an oblique front view the backpack support system according to the disclosure according to FIG. 1, likewise with a main pack compartment mounted on it.

It is particularly advantageous if the backpack support system includes at least one main compartment 22, see FIGS. 5 and 6. The main compartment 22 and the back plate 4 as well as the hooks 6, 7 are preferably embodied so that the main compartment 22 can be mounted to the side of the back plate 4 facing away from the wearer's body without tools and can be also removed from it again without tools. Preferably, the main compartment has its own shoulder straps so that the wearer can wear it in front of his chest when transporting the bike.

It is particularly advantageous if the main compartment has at least one and better still, several openings into which a hook 6; 7 can be slid in order to accommodate the bike.

In the optimum case, the main compartment is embodied so that it can be fastened to the back plate without tools, simply by means of or with the participation of being hung, clicked, and/or clamped in the hooks 6, 7 and can also be removed from them again without tools.

It is particularly advantageous if the backpack support system includes a locking element for the front wheel, which secures the front wheel essentially in the straight-ahead riding position. The locking element can be a belt or cable with a quick-release or a click connector, is placed snugly around the down tube and transversely to the rim of the front wheel and then holds the latter captive. In this case, it is particularly advantageous if the locking element is fastened to the frame of the backpack support system in captive fashion, e.g. is tethered to it.

Figure 8:
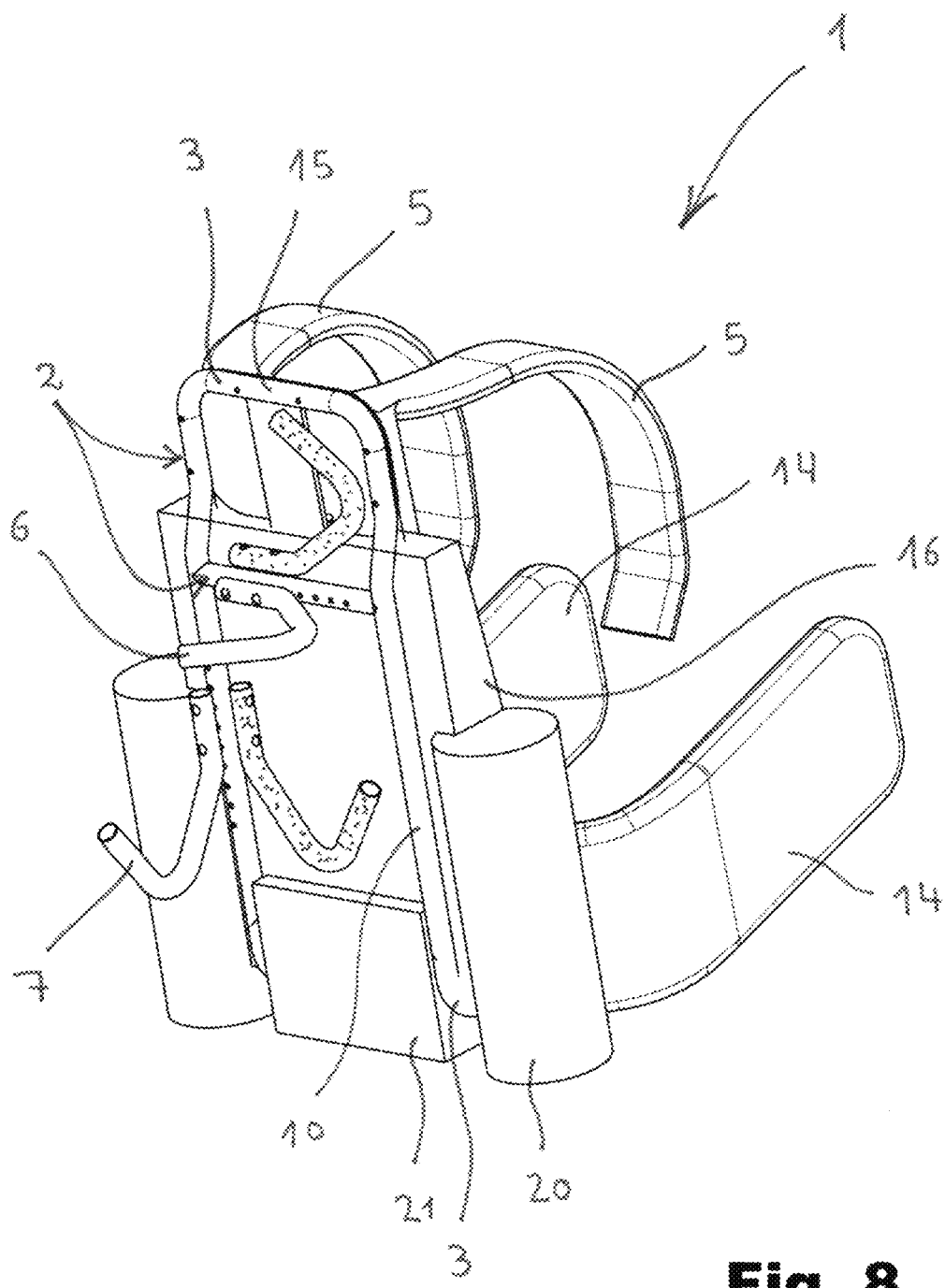
FIG. 8 shows a second exemplary embodiment of the disclosure.

FIG. 8 shows a second exemplary embodiment of the disclosure.

Its design corresponds to that of the first exemplary embodiment, which is why everything that has been explained above for the first exemplary embodiment also applies to the second exemplary embodiment. The sole difference lies in the fact that the second exemplary embodiment dispenses with the protective back plate for weight reasons. Instead, the frame 2 has at least one additional horizontal strut 23. Ideally, the first hook 6 is mounted to this additional horizontal strut or to one of these additional horizontal struts 23. In order to be able to adjust the position of the first hook 6, the additional horizontal strut is provided with a set of holes extending along its longitudinal axis or with pairs of holes on opposite sides of the longitudinal axis from one another, by means of which the first hook 6 can be screw-mounted in different positions to the additional horizontal strut 23.

In this case, at least one hole or pair of holes is also provided, whose axis or whose shared axis extends essentially perpendicular to the axis or shared axis of the other holes or pairs of holes. As a result, the first hook can be attached to the frame 2 in a "folded-in" position in which it lies, for example, in the plane defined by the tubes/parts of the frame 2 immediately adjacent to it. In FIG. 8, the depiction of the hook 6 that is in its "folded-in" position is graphically highlighted with dots.

As is clearly shown, the second hook 7 is preferably fastened in basically the same way to a tube/part of the frame 2—but which generally extends in the vertical direction—so that its position can be adjusted in the vertical direction and likewise so that in the same way as described above for the first hook 6, it can be fastened to the frame in a "folded-in" position.

In FIG. 8, the depiction of the hook 7 that is in its "folded-in" position is graphically highlighted with dots.

FIGS. 9 to 16 show a third exemplary embodiment of the disclosure.

This exemplary embodiment corresponds to the preceding exemplary embodiments with regard to the positioning of the hooks 6, 7 and the way of carrying the bike and with regard to various other aspects. Consequently, that which has been said above also applies to this exemplary embodiment.

This exemplary embodiment differs from the preceding exemplary embodiments in that in this case, a soft backpack is used, which, during normal use of the backpack, has no frame or does not have a complete frame and therefore is particularly comfortable to wear.

Typically, however, it includes a—possibly also removable—reinforcing plate, which serves as a shield and is made of plastic, which should prevent solid components of a bike being carried from being able to poke into the wearer's back unimpeded, even in the event of awkward movements or possible falls.

This soft backpack features the fact that it includes special connectors, which will be discussed in further detail below.

Figure 9:
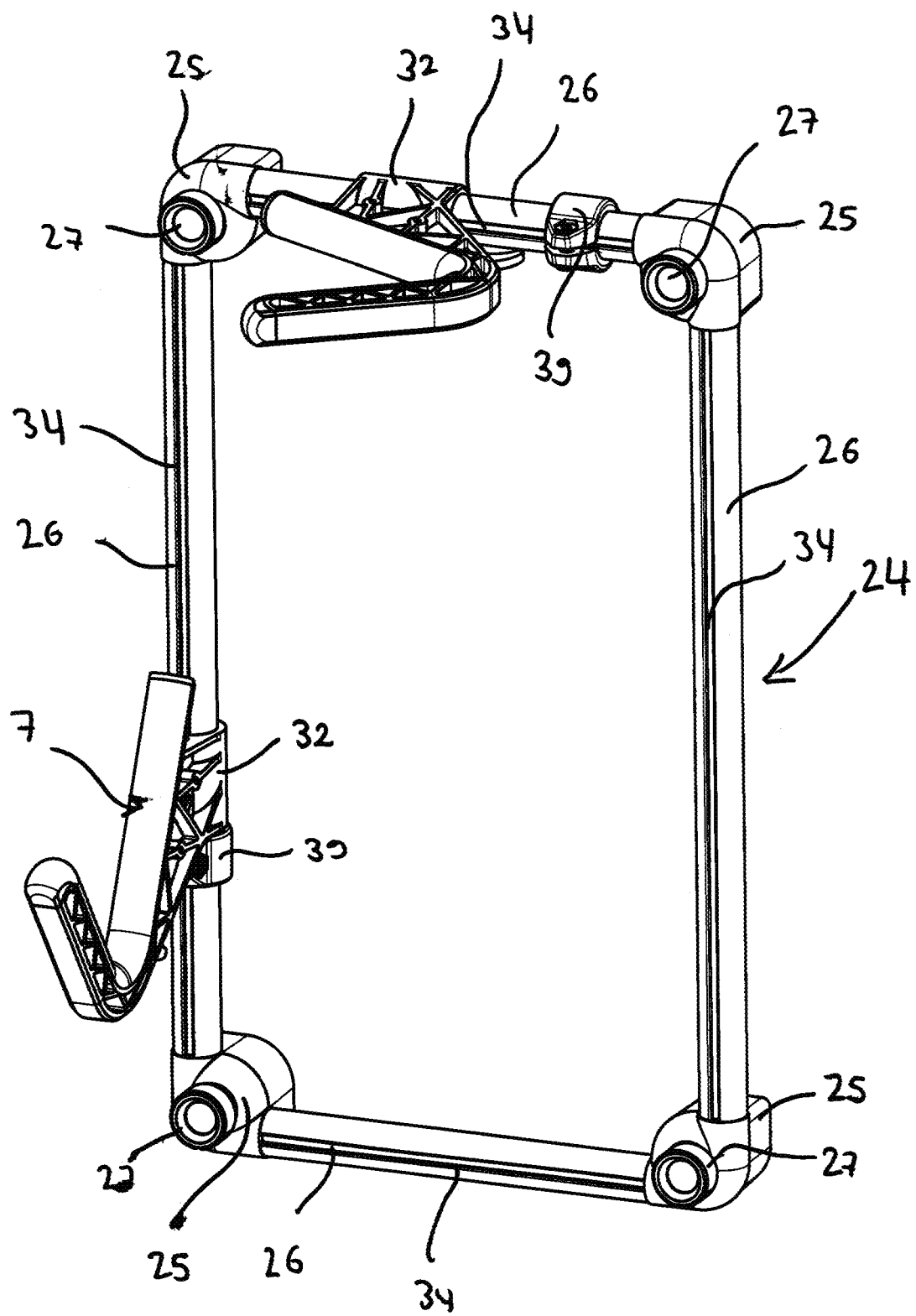
FIG. 9 shows a third embodiment and the subframe thereof.

As soon as there is a need to carry a bike, the auxiliary frame 24 shown in FIG. 9 is fastened to the backpack by means of the special connectors.

The auxiliary frame 24 features the fact that it is preferably composed of four tubes 26. Ideally, these four tubes 26 are connected to one another by means of corner connectors 25. The corner connectors are usually made of plastic. Each of the corner connectors ideally has two sleeves, which are positioned at an angle of 90° to each other. A tube 26 is inserted into each of these sleeves and fastened there. The fastening is carried out in a frictionally engaging fashion by means of a corresponding press-fit through an under-dimensioning of the sleeves relative to the tube diameter and/or by means of gluing and/or by means of a detent engagement.

As is depicted most clearly in FIGS. 10 and 11, the backpack is equipped with local reinforcements. Mounting pins 27 are affixed to them, which typically have an external pin thread 28 with which, after being inserted through the envelope of the backpack and the reinforcement provided there, they are screw-mounted to the backpack. These pins have a fastening groove 29 auf an internal pin thread 30. The fastening groove 29 is not used to fasten the auxiliary frame 24 that is initially of interest here. It is used for other purposes that will be explained in greater detail below. Instead, the auxiliary frame 24 is attached as follows:

As is clearly shown in FIG. 10, each corner connector 25 is placed onto a respective pin 27 so that a complementary cavity of the corner connector 25 accommodates the pin 27. Then a knurled screw 31 is inserted through the corner connector from the side of the corner connector facing away from the backpack and is then screwed into the internal pin thread 30. In this way, the corner connector is firmly connected to the pin 27 of the backpack. As soon as all of the connections of this kind have been produced, one to each corner connector 27, then the backpack is attached to the auxiliary frame 24 that is placed against it from the outside.

As indicated above, the pins 27 have a multiple functionality. This is because the internal pin thread 30 is only needed if an additional element is to be fastened to the pin in a particularly stable fashion, for example the auxiliary frame 24. If only lighter things are to be fastened to the pin, for example an additional bottle holder, outside pockets, a sleeping bag holder, and the like, then this is carried out in that an appropriate form-fitting element that is not shown in detail here is slid over the pin 27, which then engages by means of its latch in the groove 29 of the pin. This achieves a thread-free quick connection for outside pockets and the like.

The auxiliary frame is in turn equipped with a first hook 6 and a second hook 7, as has already been described above for the system according to the disclosure so that the statements relating to that apply here as well.

The special hooks 6, 7 used here, which incidentally can also be used in this form for the other exemplary embodiments, excel by means of their particularly clever mechanism, which permits a particularly simple folding-in and, when needed, folding-out of the respective hook 6, 7.

Figure 12:
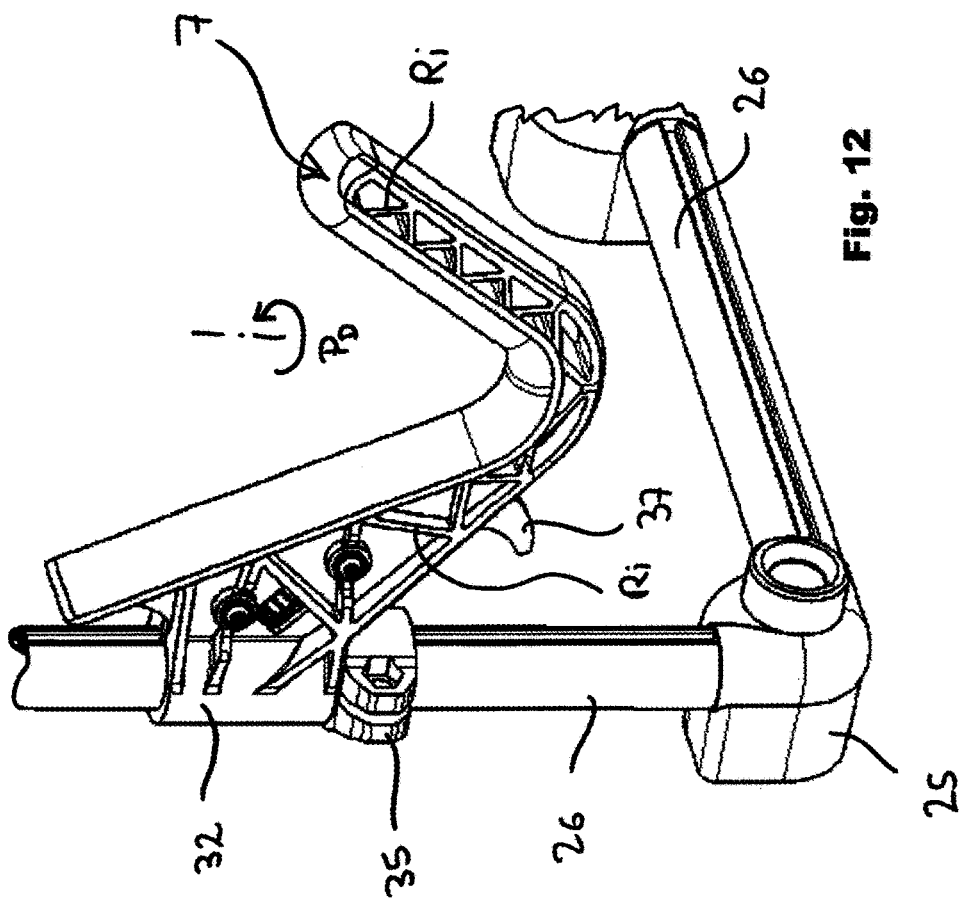
FIG. 12 shows a hook 7 in a detailed view, this hook is used in particular for the third exemplary embodiment, but can also be used in the context of exemplary embodiments 1 and 2.

The hooks are ideally injection molded of plastic and in the best case, in such a way that they each have an essentially closed hook top and hook bottom, which are connected to each other by means of ribs Ri that extend in an alternating oblique fashion, as is shown the most clearly in FIG. 12. As is shown in with particular clarity in FIG. 14, the ribs extend across most of the hook in the longitudinal direction or extend across at least 40% of the length of the hook, not extending across the entire hook, instead ending at two middle walls Mw that extend with their broad sides perpendicular to the broad sides of the ribs. The middle walls Mw preferably form guide pockets 35 between themselves, whose purpose will be discussed in greater detail below. In the region of the tips of the hooks, the ribs can extend through the entire hook so that the ribs can define a plurality of regions, which are openings DB that each pass transversely through the entire hook so that the latter is particularly light-weight.

In places where even higher-quality embodiments are required, these hooks can also be cast out of metal, for example out of a zinc pressure die-casting compound, or can even be forged out of aluminum or milled from a solid block.

As is shown most clearly in the sectional view associated with FIG. 12, the hooks have a tubular section 32, which encompasses the entire circumference of the tube. The play of the tubular section 32 is chosen so that the tubular section 32 can be slid transversely on the auxiliary frame 24 and can also be rotated, each of these in the unlocked state.

In this way, the entire hook 7 shown in FIG. 12 can be moved from its ready position shown in FIG. 12 in the direction indicated by the rotation arrow PD into a rest position that is pivoted by 90° counterclockwise.

Figure 14:
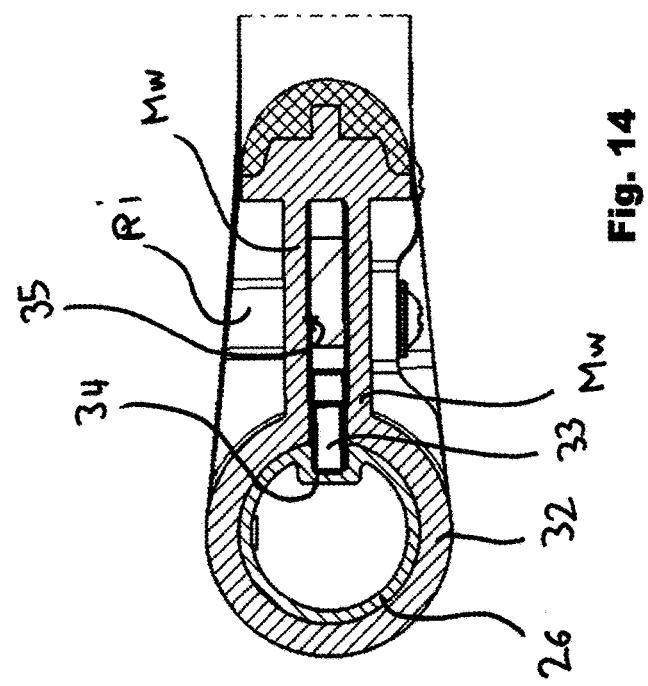
FIG. 14 shows the hook of FIG. 12 cut in a horizontal plane.
Figure 13:
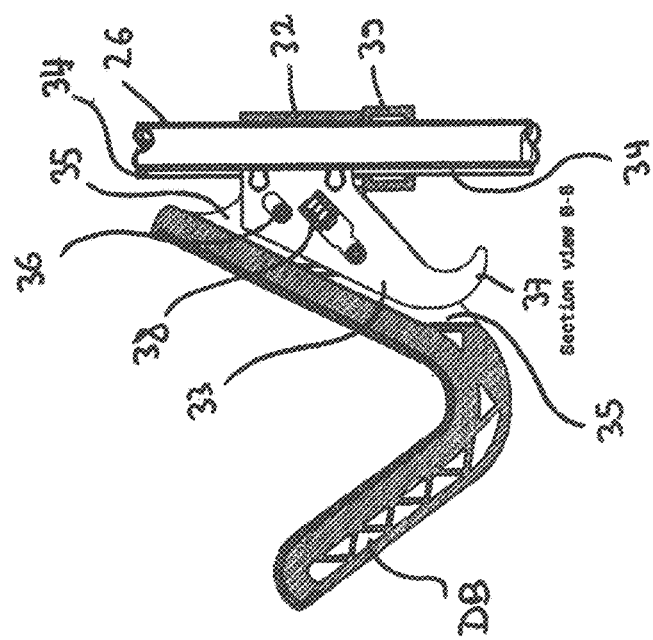
FIG. 13 shows the hook of FIG. 12 cut in a vertical plane.
Figure 15:
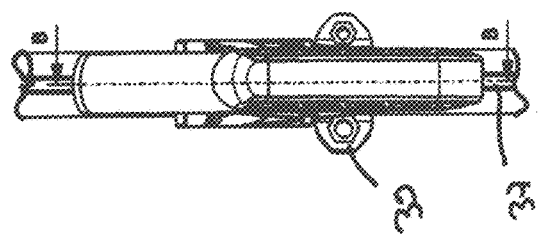
FIG. 15 shows a frontal view of the hook of FIG. 12.
Figure 16:
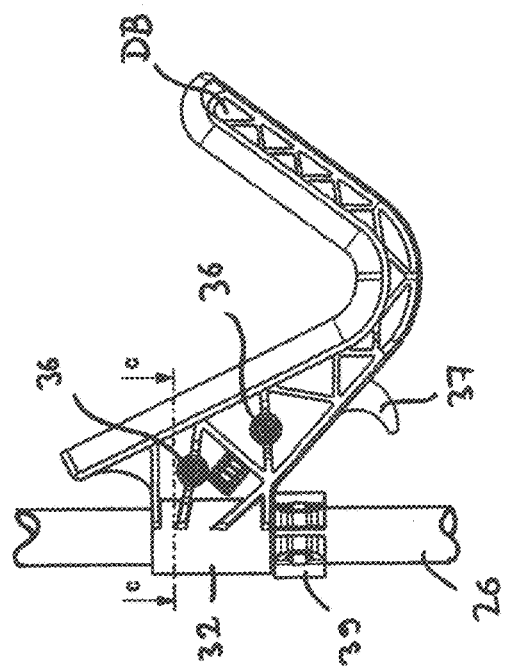
FIG. 16 shows a view of the hook of FIG. 12 obliquely from the side.

Naturally, the hook must not pivot or slip while the bike is being carried. An unwanted pivoting is preferably prevented by means of a movable detent plate 33 that is built into the hook and a groove 34 in each of the tubes of the auxiliary frame 24 or at least in each of the tubes that is provided for a hook. In the locked state, the detent plate 33 engages in the groove 34 of the tube of an auxiliary frame, as shown in FIG. 13 and FIG. 14. As a result, the hook 6 cannot be rotated relative to the tube.

At this point, it is necessary to discuss the above-mentioned guide pocket 35, which is formed between the middle walls Mw. This is because the detent plate 33 is accommodated in the guide pocket 35 of a hook 6, 7. As is shown most clearly in FIG. 13, two guide screws or guide pins 36 extend through each guide pocket. By means of their oblong holes or guide slots 37, the detent plate 33 is held in the guide pocket so that it is able to move in translatory fashion, preferably so that the main part of the guide plate 33 is positioned inside the guide pocket 35. Usually, the guide plate 33 protrudes from the guide pocket 35 in only two places. Namely at the place in which it constitutes the actuation surface 37, which is ideally embodied in the form of a pistol-like trigger (see FIG. 12) and, with the section that is designed for engagement in the groove 34 of the respective tube 26. It is also clearly shown in FIG. 13 that the guide plate is pushed in the direction of the tube 26 by a spring 38, which is preferably accommodated by an opening in the guide frame and exerts a spreading action between the guide plate and the hook. This means that the detent plate 33 engages in detent fashion in the groove 34 as soon as the hook has been pivoted into its use position in which the detent plate 33 comes to lie exactly over the groove 34.

The tube is preferably prevented from sliding by means of the clamping ring 39. The clamping ring 39 is embodied so that it is immovably fixed to the respective tube 26 of the auxiliary frame 24 as soon as its clamping screw is tightened all the way. In this way, the clamping ring prevents the hook 6, 7, which comes to rest against it in a form-fitting way, from executing a translatory movement. For the sake of good form, it should be noted that a hook 6 or 7 is not limited to being associated with just one clamping ring 39. Instead, it is also possible for a clamping ring 39 to be positioned at both ends of the hook in order to prevent the hook from executing a translatory movement in both directions. An alternatively conceivable design is one in which in the completely tightened state, a clamping ring 39 forces the tube 26 passing through it into such an oval state that this prevents the hook from slipping. This has the advantage that then only a single clamping ring has to be provided per hook. This saves material and also reduces the amount of effort that is required in order to immobilize a hook.

For the sake of completeness, it should also be noted that one suitable option is to provide the surface of the hook that comes into contact with the bike as intended with a covering made of a particularly soft or particularly high-friction plastic. One suitable option for this, for example, is a TPE, or ideally a soft plastic, which has been applied to the hook blank by means of overmolding and firmly bonded to it.

Generally in the abstract or in combination with other already existing claims, the claims are also directed at a subject that has the features of at least one or more of the following paragraphs:

A backpack carrying system 1, which features the fact that the first and second anchoring point are spaced apart from each other in a direction perpendicular to the vertical axis of the wearer.

A backpack carrying system 1, which features the fact that the first anchoring point is mounted in the middle, between the shoulder straps.

A backpack carrying system 1, which features the fact that the first anchoring point and the first hook can be fastened to the frame in different positions in the horizontal direction, preferably with the aid of one or more oblong holes.

A backpack carrying system 1, which features the fact that the second anchoring point and the second hook 7 can be fastened to the frame 2 in different positions in the in the vertical direction, preferably with the aid of one or more oblong holes.

A backpack carrying system 1, which features the fact that the first anchoring point and the first hook 6 can be fastened to the frame 2 in different positions in the horizontal direction, preferably with the aid of one or more oblong holes.

A backpack carrying system 1, which features the fact that the frame 2 has a back plate 4.

A backpack carrying system 1, which features the fact that the frame 2 has a back plate 4 or that the backpack as such has a back plate that is built into it.

A backpack carrying system 1, which features the fact that the back plate 4 forms a shield between the wearer's back and the bike, which shield preferably covers most or ideally all of the wearer's spinal column.

A backpack carrying system 1, which features the fact that the back plate 4 has a plurality of holes, preferably oblong holes, for fastening the first hook in various alternative positions and/or has a plurality of holes, preferably oblong holes, for fastening the second hook 7 in various alternative positions.

A backpack carrying system 1, which features the fact that in addition to the back plate 4, the frame has at least one rod or tube frame 3 to which the shoulder straps 5 and preferably also a hip belt 14 are fastened.

A backpack carrying system 1, which features the fact that the rod or tube frame 3 has two rod or tube sections 10, which each have a middle section 11, which, preferably on its side facing the wearer, is connected to the back plate 4 and is adjoined at the head end by a first edge section 12, which is curved so that it forms a fastening region for a shoulder strap (5), which region lies closer to the wearer's body than the middle section 11, and/or is adjoined at the hip end by a second edge section 13, which is curved so that it forms a fastening region for a hip belt 14, which region lies closer to the wearer's body than the middle section 11.

A backpack carrying system 1, which features the fact that each of the rod or tube sections 10 has a second edge section 13, which is embodied as a hook, to which preferably at least the hip belt 14 is fastened.

A backpack carrying system 1, which features the fact that both of the rod or tube sections 10, in the extension of their first edge sections 12, transition into a connecting section 15 that unites them, which preferably extends horizontally.

A backpack carrying system 1, which features the fact that at least between the hip belt 14 and the back plate 4, a spacer 16 is provided, whose thickness is chosen so that the back plate 4 is held so that it is spaced at least 7.5 cm, or better still, at least 10 cm, and ideally, at least 14 cm from the wearer's back.

A backpack carrying system 1, which features the fact that the spacer 16 is a—preferably dimensionally stable—hollow receptacle 17 for accommodating gear, which is ideally provided with padding on its side facing the wearer's back.

A backpack carrying system 1, which features the fact that above the spacer 16, at least one other spacer is provided, whose thickness is preferably smaller in the direction toward the wearer's back.

A backpack carrying system 1, which features the fact that the at least one other spacer is likewise a—preferably dimensionally stable—hollow receptacle 17 for accommodating gear, which is ideally provided with a padding on its side facing the wearer's back/head.

A backpack carrying system 1, which features the fact that the back plate 4 has anchoring points, preferably in the form of openings, for fastening additional pockets.

A backpack carrying system 1, which features the fact that the backpack carrying system 1 includes at least one side pocket 20, preferably two of them, which is/are ideally designed for upright accommodation of a water bottle and which is/are respectively fastened in the region of a vertically extending side edge of the back plate 4, preferably fastened directly to the latter.

A backpack carrying system 1, which features the fact that the backpack carrying system 1 has at least one back pocket 21, which is located under the spacer 16, between the hip belt 14 and the back plate 4 and is preferably attached directly to the second edge section 13 of the above-mentioned rod or tube sections 10, particularly if these are embodied as a hook with a preferably horizontally extending section on which the back pocket 21 can be suspended, preferably in such a way that it does not oscillate.

A backpack carrying system 1, which features the fact that the backpack carrying system 1 includes at least one main compartment 22, which can be fastened without tools to the side of the back plate 4 facing away from the wearer's body and can be also removed from it again without tools and preferably has its own shoulder straps so that the wearer can wear it in front of his chest when transporting the bike.

A backpack carrying system 1, which features the fact that the main compartment 22 has at least one opening into which a hook 6, 7 can be inserted in order to hold the bike.

A backpack carrying system 1, which features the fact that the main compartment 22 has devices by means of which it can be fastened to the backpack carrying system 1 by using the hooks 6, 7 for holding of the bike.

A backpack carrying system 1, which features the fact that the backpack carrying system 1 includes a locking element for the front wheel, which secures the front wheel essentially in the straight-ahead riding position.

A backpack carrying system 1, which features the fact that on the outside of the backpack facing away from the wearer's back, an auxiliary frame is placed onto the backpack, which supports the hooks for hanging the bike.

A backpack carrying system 1, which features the fact that the auxiliary frame can be mounted on the backpack without tools and can be removed from the backpack once again without tools.

A backpack carrying system 1, which features the fact that the auxiliary frame is composed of a plurality of tubes, which are connected to one another with the aid of corner connectors, which have sleeves for insertion of the tubes.

A backpack carrying system 1, which features the fact that the hooks for hanging the bike have a tubular section, which is intrinsically closed and which encompasses a tube that holds the hook; the respective hook is preferably supported on the tubular section in rotary fashion and its rotary movement relative to the tubular section can be locked.

A backpack carrying system 1, which features the fact that each hook has a spring-loaded locking element, preferably in the form of a detent plate, which is supported in the hook in sliding fashion and which can be moved from a locking position in which the hook is secured in a way that prevents it from rotating on its tube, into an unlocked position in which it permits a rotation of the tube.

A backpack carrying system 1, which features the fact that each hook has a pocket that accommodates most of the surface of a detent plate and in which a detent plate can move in translatory fashion, preferably in opposition to the force of a spring; where each detent plate is preferably embodied so that an actuating section, which is preferably embodied as a finger hook, which protrudes outward, ideally on the underside facing away from the hook side.

A backpack carrying system 1, which features the fact that the pocket has at least two pins extending through it on which a detent plate is guided in movable fashion with the aid of its oblong holes.

A backpack carrying system 1, which features the fact that the auxiliary frame and the backpack are connected using form-fitting elements, which are in turn screw-mounted to the outside of the backpack and which have a coupling section to which additional elements can be fastened by means of form-fitting engagement, and which also have a thread for the screw-mounting of the additional frame.

A backpack transport unit composed of a backpack carrying system 1 according to one of the preceding paragraphs and/or according to one of the explicitly stated claims and a bike that is fastened to the backpack carrying system (1) so that it can be carried.

A backpack transport unit, which features the fact that the bike is fastened to the backpack carrying system 1 so that the bike is carried in an upended fashion and its rear wheel is oriented transversely relative to the direction in which the person carrying it is walking.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

REFERENCE NUMERAL LIST 1 backpack support system
2 frame
3 rod or tube frame
4 back plate
5 shoulder strap
6 first hook
7 second hook
8 mounting openings in the back plate
9 mounting openings in the back plate
10 rod or tube section
11 middle section of the rod or tube section
12 first edge section of the rod or tube section
13 second edge section of the rod or tube section
14 hip belt
15 connecting section
16 spacer
17 dimensionally stable hollow receptacle
18 not assigned
19 not assigned
20 side pocket
21 back pocket
22 main compartment
23 additional horizontal strut
24 auxiliary frame
25 corner connector
26 tube
27 pin
28 external pin thread
29 groove
30 internal pin thread
31 knurled screw
32 tubular section of a hook
33 detent plate
34 groove in the frame 26
35 guide pocket 36 guide screw or guide pin
27 actuation surface, preferably embodied in the form of a pistol-like trigger
38 spring
39 clamping ring
PD rotation arrow
Mw middle wall
Ri rib
DB opening extending transversely through the hook
M center line
FG vertical weight force
ALPHA acute angle
Note Regarding the Assignment of Reference Numerals:

Reference numerals that indicate the subassembly with an arrow indicate a subassembly that is composed of a plurality of individual components or sections, which in turn are associated with their own reference numerals. Reference numerals that indicate a component or section with a simple line indicate an individual component that is not subdivided further.

We claim:

1. A backpack support system for transporting a bike on the back of a wearer in a hands-free way, comprising:
   a frame equipped with shoulder straps and with a bike mount for fastening the bike to the frame;
   the bike mount having a first anchoring point and a second anchoring point, which are embodied spaced apart from each other;
   wherein the first anchoring point is a rigid hook;
   wherein the second anchoring point is a rigid hook;
   wherein the hooks of the first and second anchoring points are mounted at different heights, viewed along the vertical axis of the wearer, to provide a lower hook and an upper hook;
   wherein the hooks of the first and second anchoring points are positioned spaced apart from each other in the horizontal direction;
   wherein two legs that form the lower hook are oriented so that the two legs extend in a plane that is essentially vertical;
   wherein the lower hook is open toward the top so that the bike is hung in the lower hook from above;
   wherein two legs that form the upper hook define a plane that is oriented transversely to the plane in which the two legs of the upper hook lie; and
   wherein the upper hook is open at the side oriented toward the lower hook.

2. The backpack support system of claim 1, wherein the first anchoring point and second anchoring point are mounted at different heights in the direction along the vertical axis of the wearer which is predetermined with proper use of both of the shoulder straps.

3. The backpack support system of claim 1, wherein the second anchoring point absorbs at least ⅔ of the weight force of the bike.

4. The backpack support system of claim 1, wherein the first anchoring point is embodied so that it does not absorb any vertical forces.

5. The backpack support system of claim 1, wherein the hook of the second anchoring point lies in a vertical plane.

6. The backpack support system of claim 1, wherein the hook of the second anchoring point is connected to the frame in a non-moving fashion.

7. The backpack support system of claim 1, wherein the hook of the first anchoring point lies in a horizontal plane.

8. The backpack support system of claim 1, wherein the hook of the first anchoring point is connected to the frame in a non-moving fashion.

9. The backpack support system of claim 1, wherein the hooks of the first and second anchoring points are positioned so that the bike can be hung in the hooks in such a way that the bike can be carried in an upended fashion with the front wheel pointing upward.

10. The backpack support system of claim 1, wherein the hook of the second anchoring point is mounted so that after the bike is hung, the bike tends to rotate under the influence of its weight force (FG) so that the bike is pushed into the hook of the first anchoring point.

11. The backpack support system of claim 1, wherein the two legs of at least one hook of the first and second anchoring points for hanging the bike are arranged in a V shape relative to each other, which open outward in such a way that between themselves, they are able to clamp bike frame tubes with nominal diameters of 28 mm to 55 mm.

12. The backpack support system of claim 1, wherein at least one hook of the first and second anchoring points for hanging the bike is/are provided with a friction-increasing surface.

13. The backpack support system of claim 12, wherein the friction-increasing surface is made of rubber, unvulcanized rubber, or a thermoplastic elastomer.

14. The backpack support system of claim 1, wherein the hook of the first anchoring point can be fastened to the frame at different positions in the vertical direction.

15. The backpack support system of claim 14, further comprising one or more oblong holes for fastening the hook of the first anchoring point to the frame at different positions in the vertical direction.

* * * * *